United States Patent
Yama et al.

(10) Patent No.: US 8,905,169 B2
(45) Date of Patent: Dec. 9, 2014

(54) EXTERIOR COVER FOR SADDLE-TYPE VEHICLE, AND VEHICLE INCORPORATING THE SAME

(75) Inventors: Shiro Yama, Saitama (JP); Yusuke Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 13/542,095

(22) Filed: Jul. 5, 2012

(65) Prior Publication Data

US 2013/0015008 A1 Jan. 17, 2013

(30) Foreign Application Priority Data

Jul. 11, 2011 (JP) ................ 2011-153053

(51) Int. Cl.
- *B60K 11/04* (2006.01)
- *B62J 17/00* (2006.01)
- *B62J 35/00* (2006.01)

(52) U.S. Cl.
CPC . *B62J 17/00* (2013.01); *B62J 35/00* (2013.01)
USPC ........................................ 180/68.4; 180/68.1

(58) Field of Classification Search
USPC ................................................ 180/68.4, 68.1
See application file for complete search history.

(56) References Cited

U.S. PATENT DOCUMENTS

| | | | | |
|---|---|---|---|---|
| 4,685,530 A | * | 8/1987 | Hara | 180/219 |
| 4,709,774 A | * | 12/1987 | Saito et al. | 180/229 |
| 5,566,746 A | * | 10/1996 | Reise | 165/41 |
| 5,715,904 A | * | 2/1998 | Takahashi et al. | 180/229 |
| 7,387,180 B2 | * | 6/2008 | Konno et al. | 180/68.3 |
| 7,410,025 B2 | * | 8/2008 | Sunaguchi et al. | 180/229 |
| 7,448,461 B2 | * | 11/2008 | Misaki et al. | 180/68.4 |
| 7,537,077 B2 | * | 5/2009 | Nakashima et al. | 180/229 |
| 7,552,788 B2 | * | 6/2009 | Satake | 180/68.1 |
| 7,556,115 B2 | * | 7/2009 | Iwanaga | 180/229 |
| 8,006,791 B2 | * | 8/2011 | Nakagome et al. | 180/68.1 |
| 8,006,792 B2 | * | 8/2011 | Nakao et al. | 180/68.1 |
| 8,230,958 B2 | * | 7/2012 | Takahashi et al. | 180/68.1 |
| 8,256,556 B2 | * | 9/2012 | Inose et al. | 180/219 |
| 8,302,723 B2 | * | 11/2012 | Mitomi et al. | 180/229 |
| 2006/0012207 A1 | * | 1/2006 | Ishino | 296/78.1 |
| 2006/0175112 A1 | * | 8/2006 | Yoshida et al. | 180/229 |
| 2006/0219450 A1 | * | 10/2006 | Misaki et al. | 180/68.4 |
| 2007/0107967 A1 | * | 5/2007 | Satake | 180/218 |
| 2011/0180345 A1 | * | 7/2011 | Iida et al. | 180/309 |
| 2012/0248734 A1 | * | 10/2012 | Matsushima et al. | 280/281.1 |
| 2013/0015007 A1 | * | 1/2013 | Inoue et al. | 180/68.4 |
| 2013/0015008 A1 | * | 1/2013 | Yama et al. | 180/68.6 |

FOREIGN PATENT DOCUMENTS

JP 2010-190141 A 9/2010

* cited by examiner

*Primary Examiner* — Jeffrey J Restifo
(74) *Attorney, Agent, or Firm* — Carrier Blackman & Associates, P.C.; Joseph P. Carrier; Fulchand P. Shende (57) ABSTRACT

An exterior cover (shroud) for a saddle-type vehicle is formed by integrally uniting a plurality of resin members including a front cover section and a rear cover section. The shroud is insert molded to form an overlapping part where the front cover section and the rear cover section overlap with each other. The front cover section has an external-appearance-surface side at the overlapping part. The rear cover section has a non-external-appearance-surface side, which overlaps with the front cover section at the overlapping part. The rear cover section has a rib extending on the non-external-appearance-surface side. Such exterior cover prevents a sink mark from being generated in the external appearance surface of the front cover section, and improves the external appearance of vehicle.

20 Claims, 9 Drawing Sheets

EXTERIOR COVER FOR SADDLE-TYPE VEHICLE, AND VEHICLE INCORPORATING THE SAME

CROSS-REFERENCE TO RELATED APPLICATIONS

The present invention claims priority under 35 USC 119 based on Japanese patent application No. 2011-153053, filed on Jul. 11, 2011. The entire subject matter of this priority document, including specification claims and drawings thereof, is incorporated by reference herein.

BACKGROUND OF THE INVENTION

1. Field of the Invention

The present invention relates to an exterior cover for a saddle-type vehicle, and to a vehicle incorporating the same. More particularly, the present invention relates to an exterior cover having a rib formed on one of plurality of cover sections thereof, and to vehicle incorporating the same.

2. Description of the Background Art

There is a known saddle-type vehicle, in which a radiator is covered from each of lateral sides thereof with a radiator shroud, which is an exterior cover made of resin. An example of such saddle-type vehicle is disclosed in the Japanese Patent Laid-open No. 2010-190141. In such known radiator shroud, an inside surface of the radiator shroud is provided with a rib as a contact seat, and the rib is put in contact with an outer surface of the radiator, to thereby lock the radiator shroud in a desired position.

Meanwhile, in the radiator shroud of the saddle-type vehicle according to the Japanese Patent Laid-open No. 2010-190141 disclosure, in order to utilize the rib as a reinforcement member or a contact seat, the height and the material thickness of the rib have to be set comparatively large, so that the material thickness at a base portion of the rib tends to be large. However, setting the material thickness at the base portion of the rib to be larger results in that a sink mark would be generated in the external-appearance surface of the radiator shroud serving as an exterior cover, leading to a worsened external appearance.

The present invention has been made in consideration of the above-mentioned circumstances. Accordingly, it is one of the objects of the present invention to prevent a sink mark from being generated in an external-appearance surface of an exterior cover for a saddle-type vehicle and to improve the external appearance of the vehicle.

SUMMARY OF THE INVENTION

In order to achieve the above objects, according to the present invention, an exterior cover for a saddle-type vehicle, formed by integrally uniting a plurality of resin members (60, 70), is characterized in that the exterior cover (37) is formed by one of insert molding and multi-color molding to have an overlapping part (83) where at least two resin members (60, 70) of the plurality of resin members overlap with each other; and the exterior cover (37) includes a first resin member (60) constituting an external-appearance-surface side at the overlapping part (83), and a second resin member (70) constituting a non-external-appearance-surface side while overlapping with the first resin member (60) at the overlapping part (83), with the second resin member (70) being provided with a rib (82) extending on the non-external-appearance-surface side.

According to this configuration, the exterior cover is formed by one of insert molding and multi-color molding to have the overlapping part where at least two resin members of a plurality of resin members overlap with each other. The exterior cover includes the first resin member constituting the external-appearance-surface side at the overlapping part, and the second resin member constituting the non-external-appearance-surface side while overlapping with the first resin member at the overlapping part, with the second resin member being provided with the rib extending on the non-external-appearance-surface side. Therefore, a sink mark in the rib of the second resin member constituting the non-external-appearance-surface side overlaps with and is hidden by the first resin member constituting the external-appearance-surface side. Accordingly, it is possible to prevent a sink mark from being generated in the external appearance surface, and to improve the external appearance of the vehicle. In addition, since the sink mark in the rib is hidden, the rib can be enlarged to thereby enhance the rigidity of the exterior cover, and the plate thickness of the exterior cover can be reduced. This also promises a reduction in weight.

Besides, in the above-mentioned configuration, a configuration may be adopted in which the first resin member (60) is provided at the overlapping part (83) with a projection (88) projecting toward the non-external-appearance-surface side of the second resin member.

In this case, the first resin member is provided at the overlapping part with the projection projecting toward the non-external-appearance-surface side, and the projection is embedded in the second resin member by insert molding or multi-color molding, whereby the area of contact between the first resin member and the second resin member at the overlapping part is increased. Accordingly, the first resin member and the second resin member can be firmly coupled to each other.

In addition, a configuration may be adopted in which the exterior cover (37) is a radiator shroud which covers a radiator (5), and the rib (82) is a contact part which makes contact with the radiator (5).

In this case, a sink mark in the rib overlaps with the first resin member to be thereby concealed, so that the rib can be enlarged to a size such as to be usable as a contact part for the radiator. Therefore, it is possible to put the rib of the radiator shroud into contact with the radiator and thereby to lock the radiator shroud.

Furthermore, a configuration may be adopted in which the overlapping part (83) is provided in a overlapping manner with an outer surface (5C) of the radiator (5), when viewed in side view.

In this case, since the overlapping part overlaps with the outer surface of the radiator, when viewed in side view, it is possible to put the rib in contact with the radiator and thereby to lock the radiator shroud.

In addition, a configuration may be adopted in which the exterior cover (37) is configured with the plurality of resin members (60, 70) being made different in color by insert molding or multi-color molding.

In this case, since the plurality of resin members are configured to be different in color by insert molding or multi-color molding, the degree of freedom in setting the external appearance can be improved.

Effects of the Invention

In the exterior cover for a saddle-type vehicle according to the present invention, the exterior cover includes the first resin member constituting the external-appearance-surface side at the overlapping part where at least two resin members overlap with each other, and the second resin member constituting the non-external-appearance-surface side while overlapping with the first resin member at the overlapping part, with the second resin member being provided with the rib extending on the non-external-appearance-surface side. In this configuration, a sink mark in the rib of the second resin member overlaps with and is hidden by the first resin member. Therefore, it is possible to prevent a sink mark from being generated in the external appearance surface, and to improve the external appearance. Besides, since the sink mark in the rib is hidden (concealed), the rib can be enlarged to thereby enhance the rigidity of the exterior cover, and the exterior cover can be reduced in plate thickness. Accordingly, a reduction in weight can be ensured.

In addition, the projection with which the first resin member is provided at the overlapping part increases the area of contact between the first resin member and the second resin member at the overlapping part. Accordingly, the first resin member and the second resin member can be firmly coupled to each other.

Besides, since the sink mark in the rib is hidden, the rib can be enlarged to a size such as to be usable as a contact part for the radiator. Accordingly, it is possible to put the rib of the radiator shroud in contact with the radiator and thereby to lock the radiator shroud.

Furthermore, since the overlapping part overlaps with the outer surface of the radiator in side view, it is possible to put the rib in contact with the radiator and thereby to lock the radiator shroud.

In addition, the plurality of resin members can be configured to be different in colors by insert molding or multi-color molding, the degree of freedom in setting the external appearance can be improved.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Now, a motorcycle according to an illustrative embodiment of the present invention will be described below, referring to the drawings. Incidentally, the upward, downward, forward, rearward, leftward and rightward directions in the following description are the directions as viewed from a driver on the vehicle.

Figure 1:
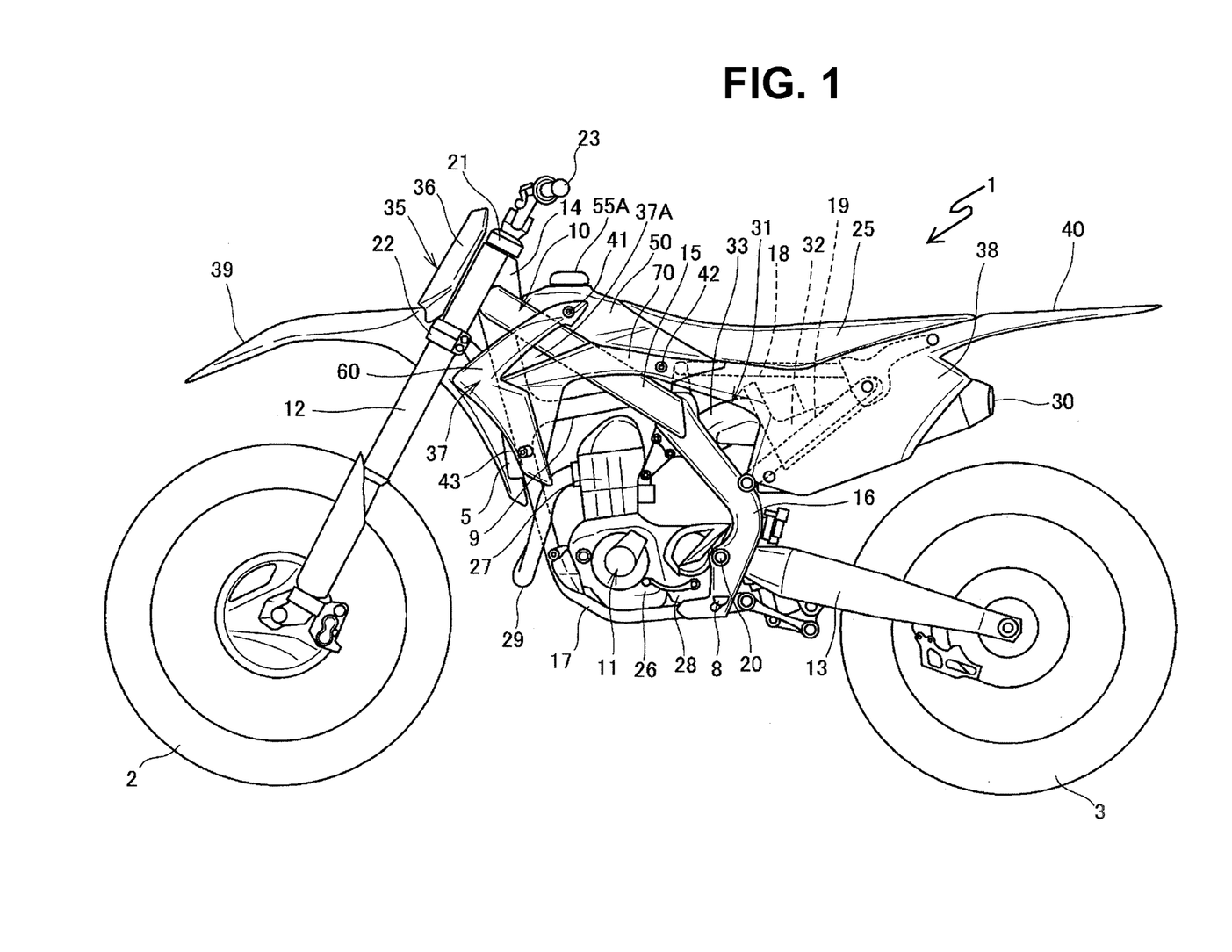
FIG. 1 is a left side view of a motorcycle according to an illustrative embodiment of the present invention.
Figure 2:
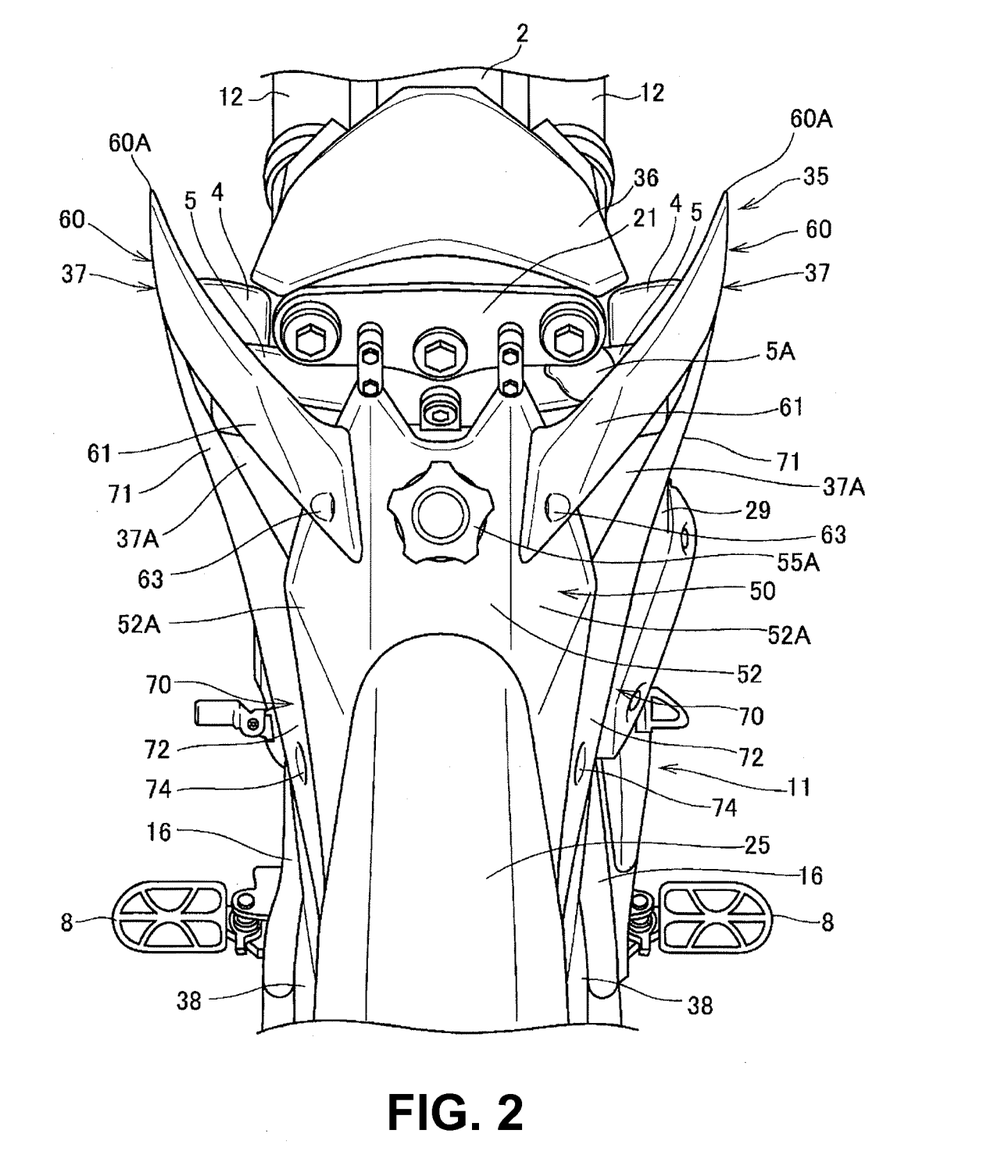
FIG. 2 is a plan view of a front portion of the motorcycle, as viewed from above.

FIG. 1 is a left side view of the motorcycle according to the illustrative embodiment of the present invention. FIG. 2 is a plan view of a front portion of the motorcycle, as viewed from above.

A motorcycle 1 is a saddle-type vehicle of an off-road type. The motorcycle 1 includes an engine 11 disposed at the fore-and-aft-directional center of a body frame 10, a front fork 12 supporting a front wheel 2 steerably supported on the front end of the body frame 10, and a swing arm 13 supporting a rear wheel 3 provided at a lower portion of a rear portion of the body frame 10.

The body frame 10 includes: a head pipe 14 supporting a pair of left and right portions of the front fork 12; a pair of left and right main frames 15 extending rearwardly downward from the head pipe 14; a pair of left and right pivot plates 16 extending rearwardly downward from the rear ends of the main frames 15, then bent toward a front lower side and extending downward; a down frame 17 extending downward from the head pipe 14, branched to the left and right sides on the front side of the engine 11, extending under the engine 11, and connected to the lower ends of the pivot plates 16; a pair of left and right seat rails 18 extending roughly horizontally and rearward from upper portions of the pivot plates 16; and a pair of left and right rear pipes 19 provided bridgingly between vertically intermediate portions of the pivot plates 16 and rear portions of the seat rails 18. The down frame 17 and the main frames 15 are interconnected by a pair of left and right reinforcement pipes 9 extending on the upper side of the engine 11.

A pivot shaft 20 penetrating the left and right pivot plates 16 in the vehicle width direction is provided on the pivot plates 16. The swing arm 13 is swingably supported on the pivot shaft 20. The rear wheel 3 is rotatably supported on the rear end of the swing arm 13. A pair of left and right steps 8 is provided on lower portions of the pivot plates 16.

A steering shaft (not shown) is rotatably supported on the head pipe 14. The front fork 12 is connected to a top bridge 21 and a bottom bridge 22 which are connected respectively to the upper end and the lower end of the steering shaft. A steering handle 23 (not shown in FIG. 2) is mounted to the top bridge 21.

A fuel tank 50 is fixed on the upper side of the head pipe 14 so as to lie along the main frame 15. A seat 25, for a driver and a passenger, is continuous with a rear portion of the fuel tank 50. The seat 25 extends rearward while being supported by the seat rails 18.

The engine 11 is a water-cooled four-cycle single-cylinder engine. The engine 11 includes a crankcase 26 in which a crankshaft (not shown) extending in the vehicle width direction is housed, and a cylinder 27 which extends upward, while being slightly tilted forward, from a front portion of the crankcase 26. The engine 11 is supported between the main frames 15 and the down frame 17. A transmission unit 28 is provided at a rear portion of the crankcase 26 in an integral fashion.

An exhaust pipe 29 is connected to a front portion of the cylinder 27. The exhaust pipe 29 is bent to the right side, extends downward, and is branched into two portions, which are connected respectively to a pair of left and right mufflers 30 provided on the lower side of the rear pipes 19.

An intake system 31 for supplying a fuel and air to the engine 11 is disposed on the rear side of the cylinder 27. An air cleaner box 32 constituting an outside air intake port of the intake system 31 is disposed in a space surrounded by the left and right seat rails 18 and the left and right rear pipes 19. A connecting tube 33 extending toward the cylinder 27 side is connected to a front portion of the air cleaner box 32.

A plate-shaped radiator 5 extending vertically is provided forwardly of the cylinder 27. The radiator 5 is provided in the form of a pair of portions while being divided to the left and right sides of the down frame 17, and is fixed to the down frame 17.

The motorcycle 1 has a body cover 35 made of resin. The body cover 35 includes a front cover 36 covering the front side of the head pipe 14, a pair of left and right shrouds 37 (exterior cover, radiator shrouds) covering an upper portion of the down frame 17 and the lateral sides of the main frames 15, and a pair of left and right side covers 38 covering the air cleaner box 32 and the muffler 30 etc. from lateral sides on the lower side of the seat 25.

A front fender 39 is fixed to the bottom bridge 22, and a rear fender 40 is provided rearwardly of the seat 25.

Figure 3:
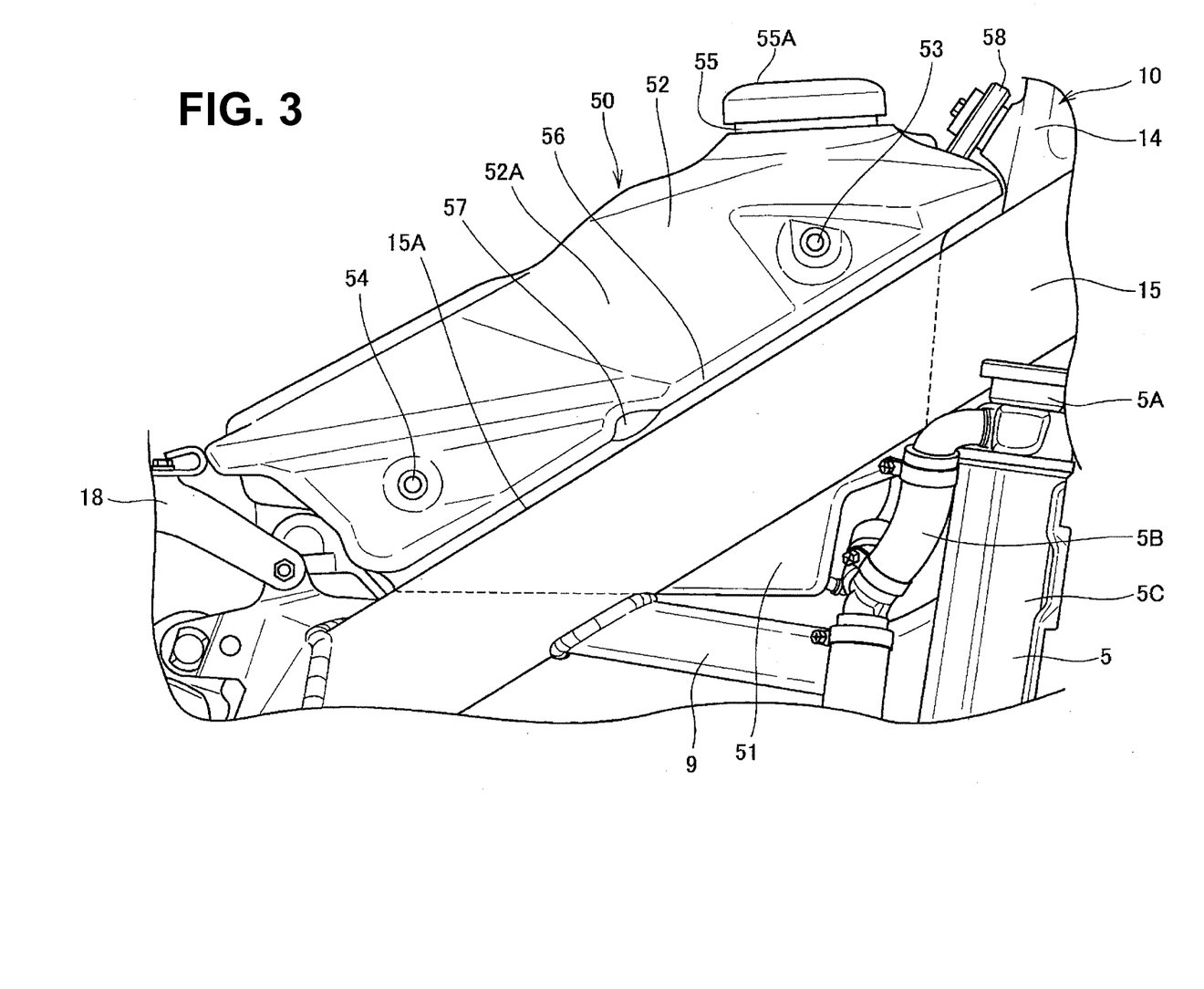
FIG. 3 is a right side view of the motorcycle, showing a state in which a shroud and a seat have been detached.

FIG. 3 is a right side view of the motorcycle 1, showing a state in which the shrouds 37 and the seat 25 have been detached.

The left and right main frames 15 extend rectilinearly rearwardly downward, and the fuel tank 50 is disposed ranging (in a bridging manner) between the left and right main frames 15. The fuel tank 50 includes a tank lower portion 51 which is disposed to be interposed between the left and right main frames 15, and a tank upper portion 52 which is located above the left and right main frames 15. The fuel tank 50 is made of resin.

A cap 55A which can be attached to and detached from a fuel filler 55 is mounted to an upper surface of a front portion of the tank upper portion 52. The tank upper portion 52 is provided at each side surface 52A thereof with a front fixing portion 53 and a rear fixing portion 54 to which bolts 41 and 42 (see FIG. 4) for fixing the shroud 37 to the fuel tank 50 are fastened. The front fixing portion 53 is located on the lower side of the fuel filler 55, while the rear fixing portion 54 is located at a rear part of the tank upper portion 52.

A lower edge portion 56 of the side surface 52A of the tank upper portion 52 extends rectilinearly along the upper surface 15A of the main frame 15. The lower edge portion 56 is formed with a recess 57 which is hollowed to the inner surface side of the fuel tank 50. The recess 57 is formed at a fore-and-aft-directionally intermediate portion of the fuel tank 50, and is located between the front fixing portion 53 and the rear fixing portion 54.

The fuel tank 50 is fastened to the body frame 10 through stays 58, which are provided at front portions of the tank upper portion 52, and a plurality of fixing portions (not shown).

At an upper portion of the radiator 5, a radiator cap 5A for closing a cooling water supply port is provided. In addition, a cooling water hose 5B connecting the radiator 5 and the engine 11 to each other is connected to a rear surface part of the upper portion of the radiator 5. At an outer side portion of the radiator 5, a side plate portion 5C extending vertically is provided. Besides, a radiator grille 4 for guiding an airflow to the radiator 5 and guarding a front surface of the radiator 5 is provided at the front surface of the radiator 5.

Figure 4:
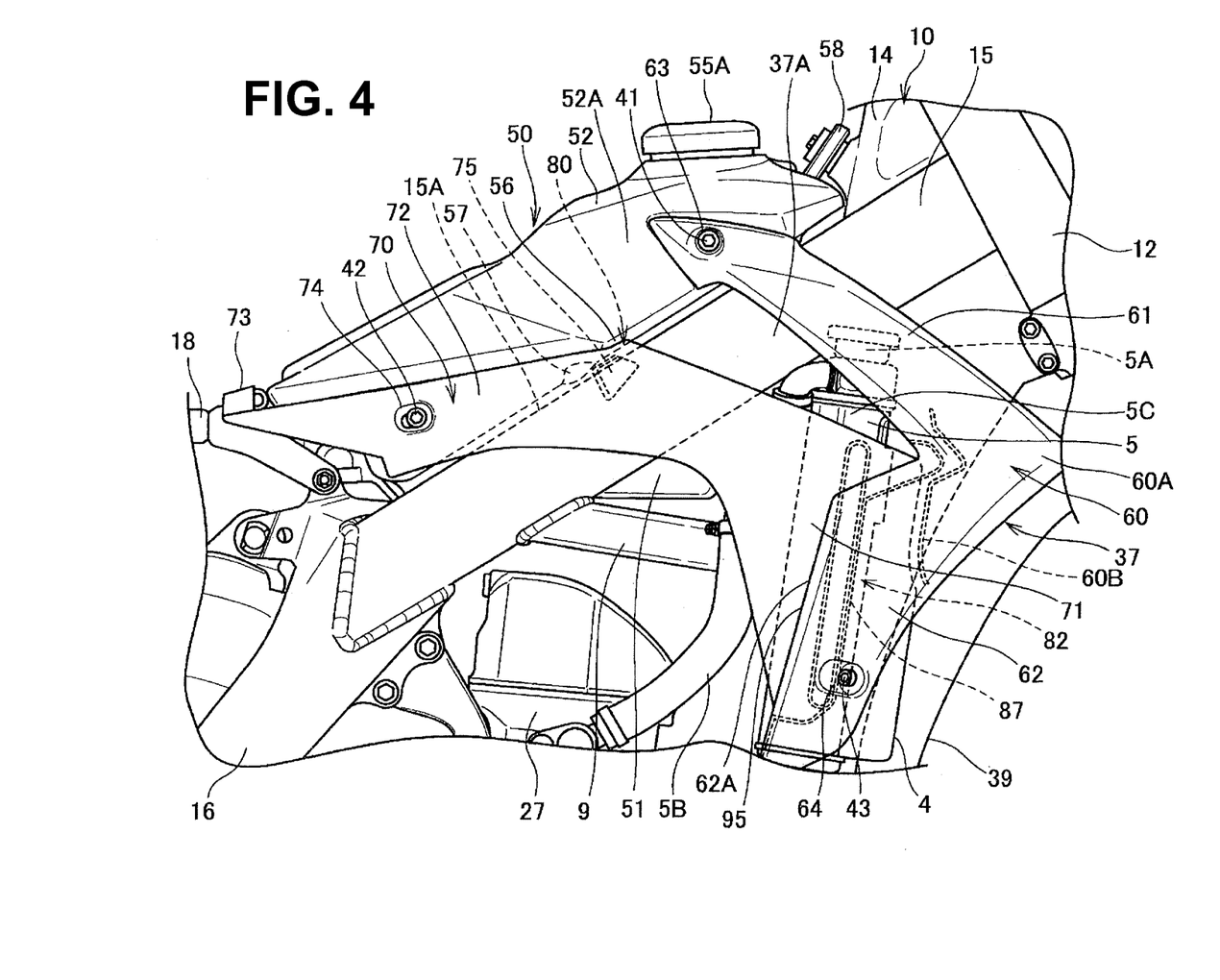
FIG. 4 is a right side view of the motorcycle, showing the vicinity of the shroud.
Figure 5:
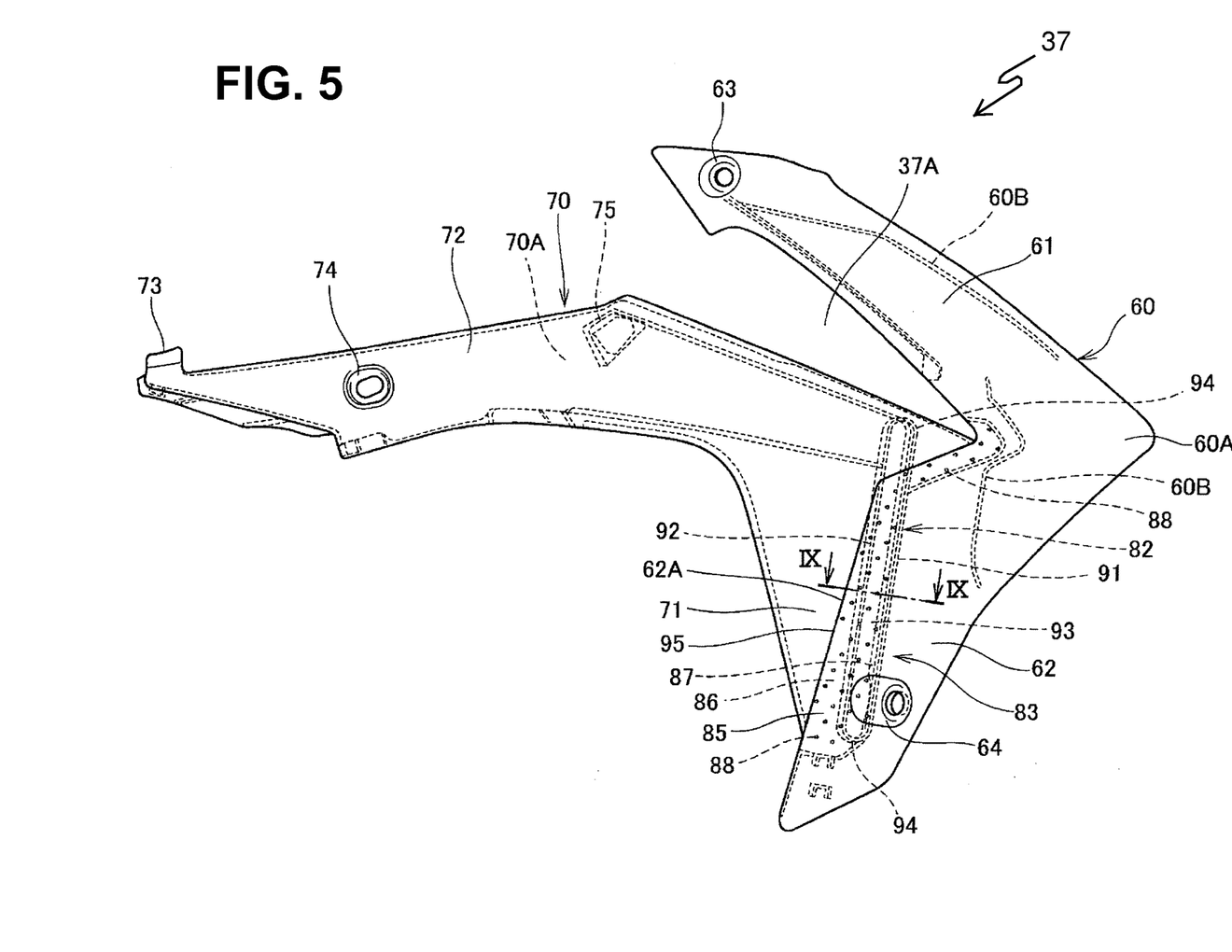
FIG. 5 is a plan view of the shroud on the right side, as viewed from a lateral side.
Figure 6:
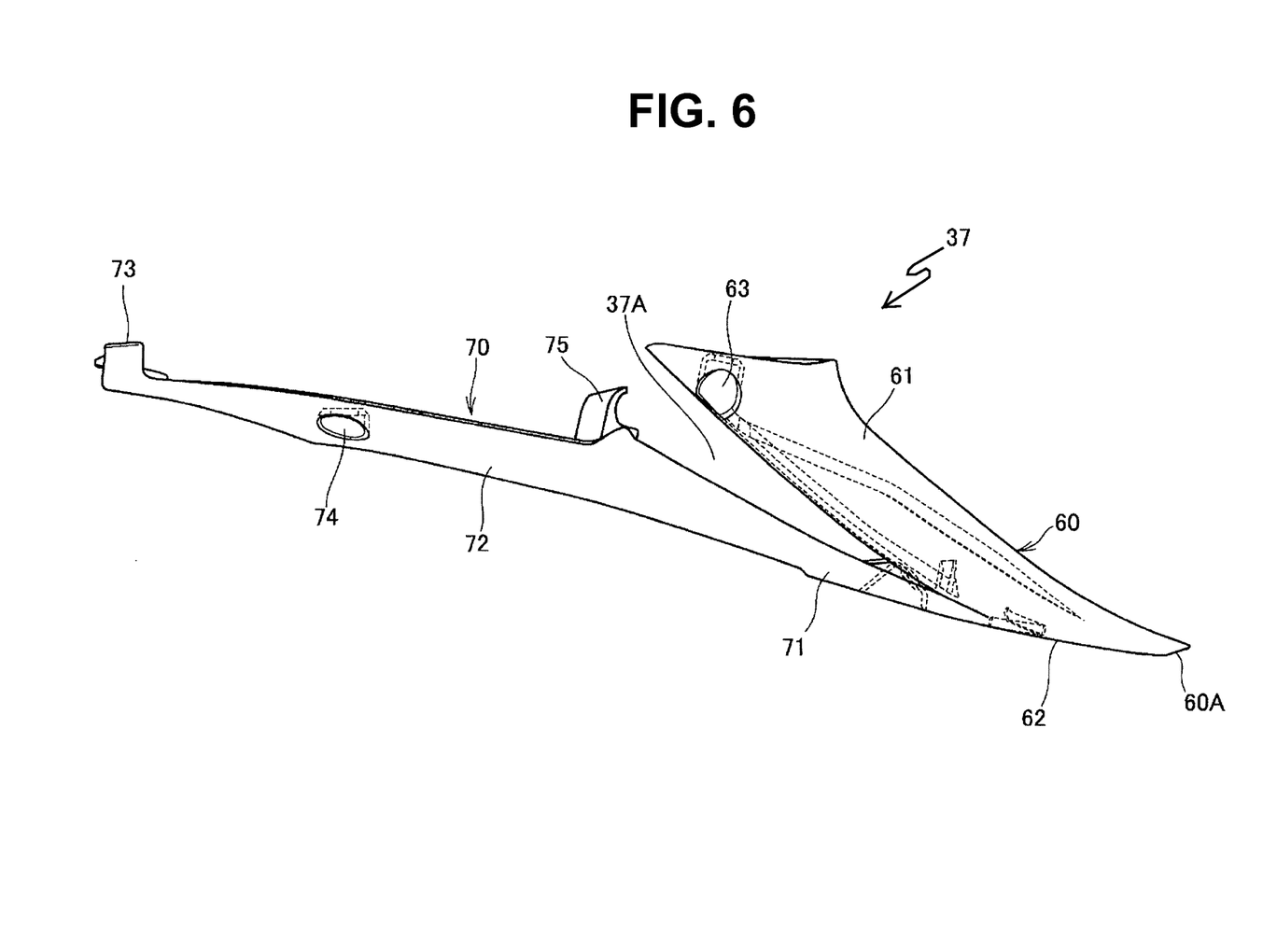
FIG. 6 is a view of the shroud on the right side, as viewed from above.

FIG. 4 is a right side view of the motorcycle 1, showing the vicinity of the shroud 37. FIG. 5 is a plan view of the shroud 37 on the right side, as viewed from a lateral side. FIG. 6 is a view of the shroud 37 on the right side, as viewed from above. The left and right shrouds 37 are configured substantially in left-right symmetry. The shroud 37 on the right side will be described in detail herein.

The shroud 37 is a plate-shaped cover for introducing an airflow to the radiator 5 from the front side. As shown in FIGS. 2 and 4 to 6, the shroud 37 projects so as to protrude obliquely to a front outer side from a side surface of the fuel tank 50, and also extends along an outer surface of the radiator 5 to extend forward beyond the radiator 5.

The shroud 37 has a front cover section 60 (first resin member, resin member) extending vertically while covering a lateral side of the radiator 5, and a rear cover section 70 (second resin member, resin member) extending rearward from a lower portion of the front cover section 60 to a rear portion of the fuel tank 50.

The front cover section 60 has an upper portion 61 obliquely extending toward a front outer side so as to spread in the vehicle width direction while extending forwardly downward from the front fixing portion 53 of the tank upper portion 52, and a lower portion 62 extending downward from a lower part of the upper portion 61 and covering the side plate portion 5C of the radiator 5. The upper portion 61 covers an upper part of the main frame 15 and an upper part of the radiator 5, and joins the lower portion 62 at a vertex portion 60A on the front side of the radiator 5. The vertex portion 60A is a portion which protrudes forwardly beyond the front surface of the radiator 5. The lower portion 62 is formed with a rib 82 extending vertically. The rib 82 makes contact with the side plate portion 5C of the radiator 5, so as to lock the shroud 37 onto the radiator 5.

The upper portion 61 is formed at its upper end part with a fixing hole portion 63 to be fastened to the front fixing portion 53 of the tank upper portion 52 by the bolt 41 (FIG. 4). The lower portion 62 is formed at its lower end part with a fixing hole portion 64 to be fastened to a side surface of a lower portion of the radiator 5 by a bolt 43 (FIG. 4).

The rear cover section 70 has a central portion 71 which is continuous with a rear edge of the lower portion 62 of the front cover section 60 and covers the side plate portion 5C of the radiator 5 and the cooling water hose 5B, and a rear extension portion 72 which extends rearward from an upper part of the central portion 71 and covers the main frame 15 and a rear part of the tank upper portion 52. The rear extension portions 72 are so inclined that their width in the vehicle width direction decreases along the rearward direction.

An opening 37A is formed between the upper edge of a front part of the rear extension portion 72 and the lower edge of the upper portion 61 of the front cover section 60, and an airflow induced by the traveling of the vehicle is permitted to pass rearward through the opening 37A, whereby air is efficiently guided to the radiator 5.

The rear extension portion 72 is formed at its rear end part with a projecting wall 73 projecting upward. The projecting wall 73 makes contact with a bottom surface of the seat 25. On the front side of the projecting wall 73 at the rear part of the rear extension portion 72, a fixing hole portion 74 to be fastened to the rear fixing portion 54 of the tank upper portion 52 by the bolt 42 (FIG. 4) is formed. An inner side surface 70A of the rear extension portion 72 is formed at a fore-and-aft-directionally intermediate portion thereof with a hook portion 75 to be hooked onto the main frame 15. In the present embodiment, the shroud 37 can be fixed to the vehicle body by hooking the hook portion 75 onto the main frame 15, so that the shroud 37 can be fixed to the motorcycle 1 with a simple structure.

In this embodiment, the shroud 37 is produced by insert molding in which a mold is used. Specifically, the shroud 37 is produced by a method in which, to the front cover section 60 as the first resin member molded from a resin earlier, the rear cover section 70 as the second resin member molded from a resin after the front cover section 60 is connected by insert molding.

Figure 7:
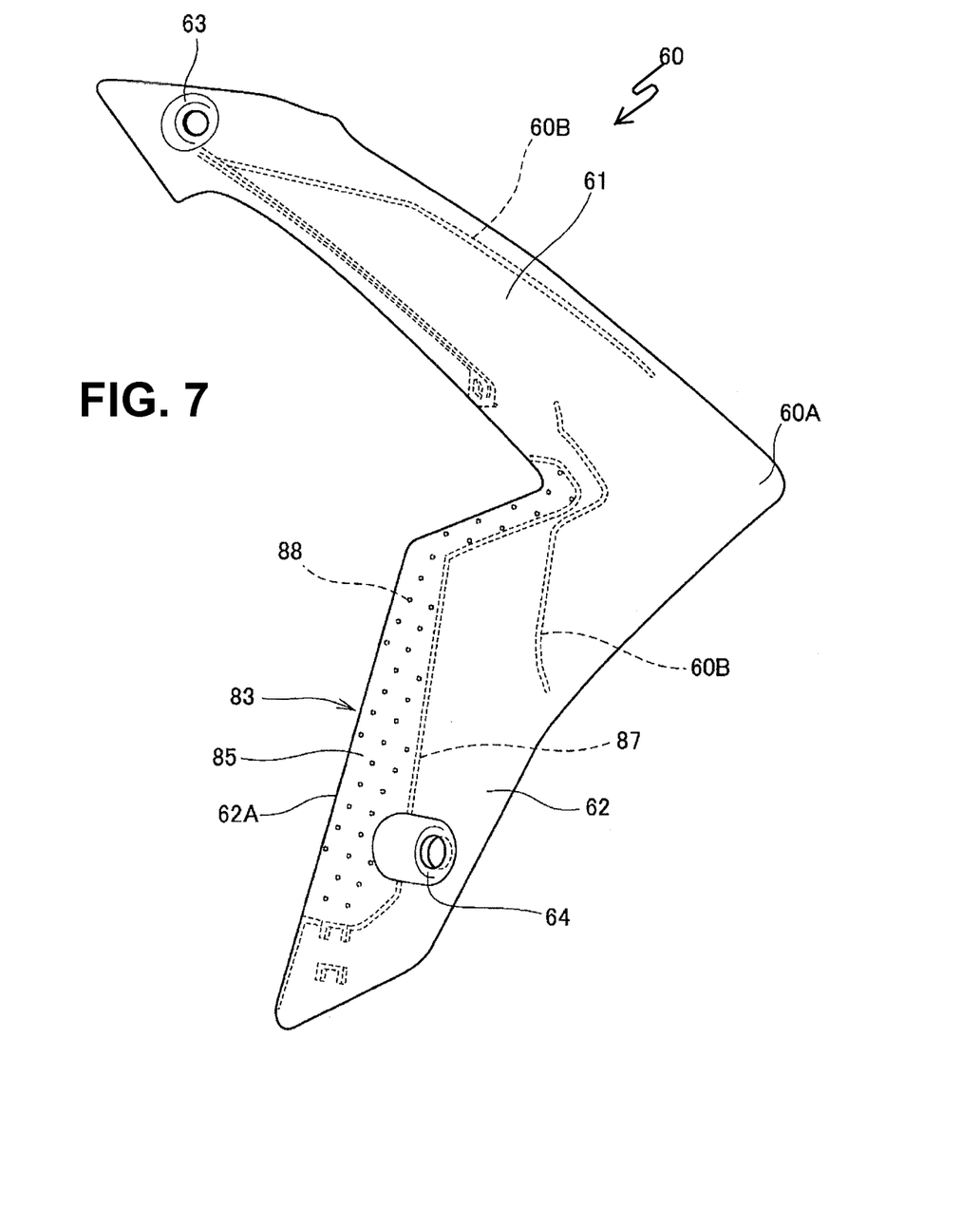
FIG. 7 is a side view of a front cover section.
Figure 8:
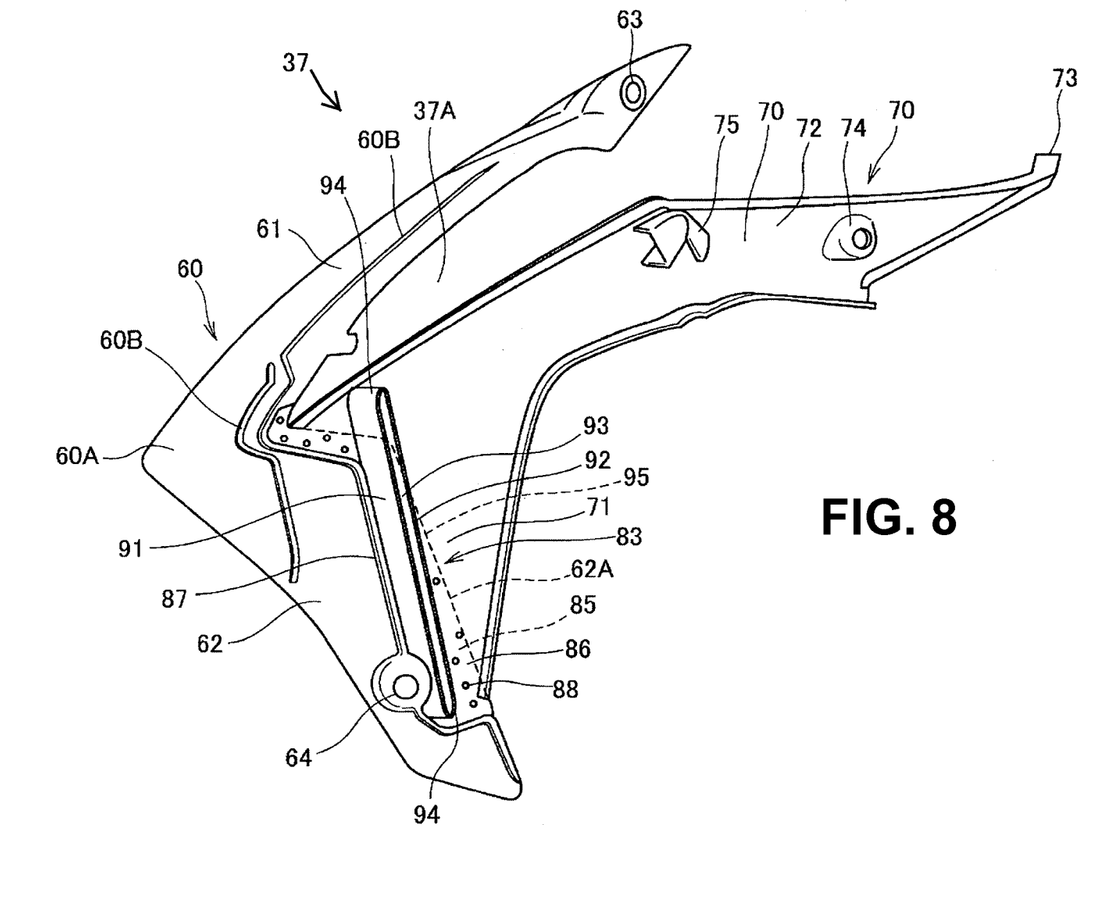
FIG. 8 is a view of the shroud, as viewed from the back side thereof
Figure 9:
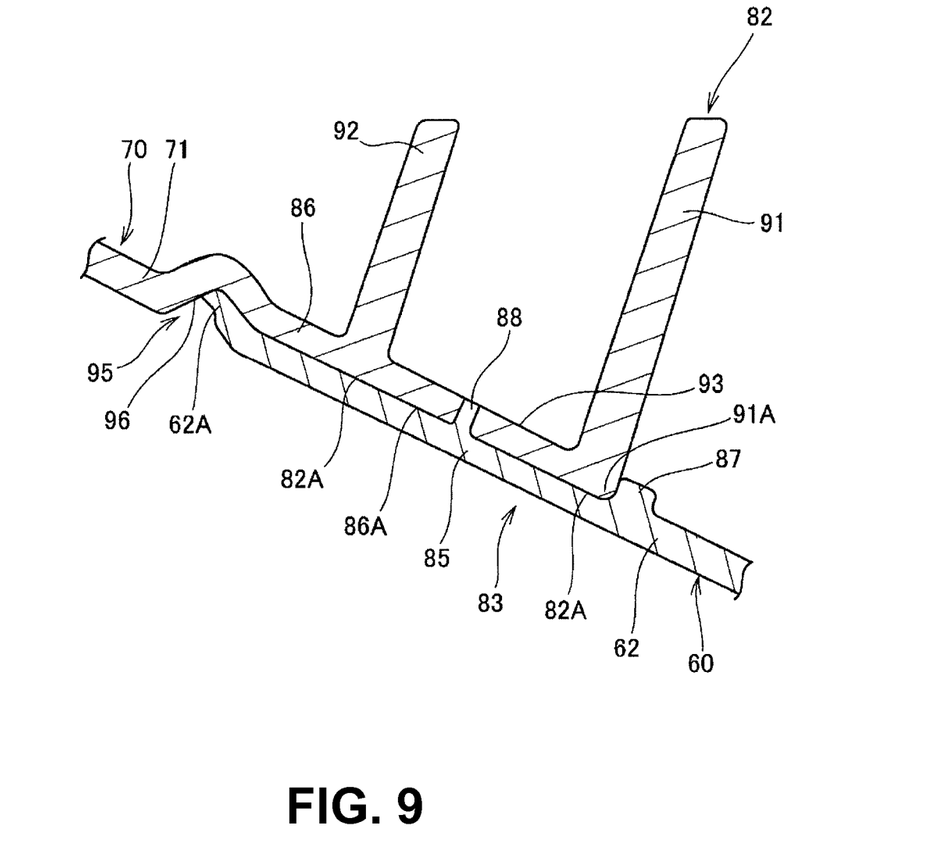
FIG. 9 is a sectional view taken along line IX-IX of FIG. 5.

FIG. 7 is a side view of the front cover section 60. FIG. 8 is a view of the shroud 37, as viewed from the back side thereof. FIG. 9 is a sectional view taken along line IX-IX of FIG. 5.

As shown in FIGS. 5 and 7 to 9, the shroud 37 has an overlapping part 83 where a rear part of the front cover section 60 and a front part of the rear cover section 70 overlap with each other. The overlapping part 83 is coupled at the time of insert molding. Specifically, at the overlapping part 83, a second resin member side connection portion 86 formed at a front part of the central portion 71 of the rear cover section 70 is overlappingly coupled to a first resin member side connection portion 85 formed at a rear part of the lower portion 62 of the front cover section 60, from a vehicle-width-directionally inner side, that is, from the side of the back surface of the first resin member side connection portion 85.

At the overlapping part 83, the first resin member side connection portion 85 exposed to an outer surface of the vehicle constitutes an external appearance surface, whereas the second resin member side connection portion 86 overlapping on the back surface side of the first resin member side connection portion 85 constitutes a non-external-appearance surface which is not visible, i.e., concealed from the outside.

As shown in FIGS. 7 and 9, the first resin member side connection portion 85 has a demarcation rib 87 extending along a rear edge part 62A of the lower portion 62 of the front cover section 60, at a position deviated by a predetermined distance to the vehicle front side from the rear edge part 62A. The first resin member side connection portion 85 is formed in a region surrounded by the rear edge part 62A and the demarcation rib 87. The predetermined distance of the demarcation rib 87 is so set that the overlapping part 83 overlaps with the side plate portion 5C of the radiator 5 in side view. The area of the overlapping part 83 corresponds to the area of the first resin member side connection portion 85.

In addition, the front cover section 60 is formed at a back surface thereof with a plurality of rib portions 60B for enhancing rigidity.

The first resin member side connection portion 85 is erectly provided with a plurality of projections 88 extending toward the side of the second resin member side connection portion 86, namely, toward the side of the non-external-appearance surface.

The projections 88 are cylindrical projections disposed at predetermined intervals. The projections 88 are embedded into the second resin member side connection portion 86 at the time of insert molding. The tips of the projections 88 are set to be flush with the inside surface of the second resin member side connection portion 86. This ensures that the area of contact between the first resin member side connection portion 85 and the second resin member side connection portion 86 at the overlapping part 83 is increased by an amount corresponding to the area of the outer peripheral surfaces of all the projections 88, and that the second resin member side connection portion 86 is locked by the projections 88. Accordingly, the front cover section 60 and the rear cover section 70 can be firmly coupled to each other.

The second resin member side connection portion 86 has a rib 82 provided to erect toward the side of the radiator 5 on the non-external-appearance surface side. A tip portion of the rib 82 makes contact with the side plate portion 5C of the radiator 5. The rib 82 includes a front wall portion 91 extending vertically along the demarcation rib 87 of the first resin member side connection portion 85, and a rear wall portion 92 extending roughly in parallel to the front wall portion 91 on the rear side of the front wall portion 91. A lightening cavity portion 93 is formed between the front wall portion 91 and the rear wall portion 92. The rib 82 is provided over substantially the whole part of the vertical length of the central portion 71 of the rear cover section 70, and upper and lower ends of the front wall portion 91 and the rear wall portion 92 are interlinked by arcuate curved surface portions 94.

A base end portion 91A (FIG. 9) of the front wall portion 91 is in contact with a side surface of the demarcation rib 87 over most of the whole length of the front wall portion 91, and the front wall portion 91 is locked to the demarcation rib 87. This ensures that the front cover section 60 and the rear cover section 70 can be firmly coupled to each other.

In the shroud 37, a boundary part 95 (FIG. 9) of division between the rear cover section 70 and the front cover section 60 visible from the outside coincides substantially with the rear edge part 62A of the lower portion 62 of the front cover section 60. At the boundary part 95, the rear cover section 70 is formed at the central portion 71 thereof with a recessed groove part 96 hollowed to the side of the non-external-appearance surface. More specifically, the rear edge part 62A fits into the recessed groove part 96 at the boundary part 95, whereby a step formed between the front cover section 60 and the rear cover section 70 at the boundary part 95 is reduced, so that external appearance can be improved.

The rib 82 is used as a receiving seat for the side plate portion 5C of the radiator 5, and is comparatively large in height and plate thickness. Therefore, a sink mark may be generated in the rib 82. As shown in FIG. 9, the sink mark is generated in a sink mark generation part 82A on the surface side of the second resin member side connection portion 86 at a base end portion of the rib 82. However, at the overlapping part 83, the sink mark generation part 82A is joined to the back surface side of the first resin member side connection portion 85, and is covered by the first resin member side connection portion 85. Accordingly, the sink mark generation part 82A is never visible from the outside. That is, the sink mark generation part 82A is always concealed.

As shown in FIGS. 4, 5 and 8, most of the rib 82 exclusive of its upper end portion is formed at the overlapping part 83, so that most of the sink mark generation part 82A is concealed by the first resin member side connection portion 85, and is therefore not visible. Accordingly, it is possible to prevent a sink mark from being generated in the external appearance surface of the shroud 37.

As shown in FIG. 4, the overlapping part 83 is provided at a position where the overlapping part 83 overlaps with the side plate portion 5C of the radiator 5 in side view. Since the overlapping part 83 is thus provided at such a position as to overlap with the side plate portion 5C of the radiator 5 and the rib 82 is provided at the overlapping part 83, the shroud 37 can be supported with the rib 82 put in contact with the radiator 5. Accordingly it is possible to prevent a sink mark from being generated in the external appearance surface.

The process of producing the shroud 37 is as discussed below.

First, the front cover section 60 is molded from a resin as a primary molded product by use of a mold. The projections 88 are erectly provided in plurality on the first resin member side connection portion 85 in this state. Thereafter, the front cover section 60 demolded is set in a mold for insert molding, and a resin is poured into the mold. This results in that the rear cover section 70 inclusive of the rib 82 is molded, and the rear cover section 70 and the front cover section 60 are integrally united together, to complete the shroud 37. The plurality of projections 88 are embedded in the second resin member side connection portion 86 by the insert molding. The front cover section 60 and the rear cover section 70 are made of polypropylene.

In this embodiment, the front cover section 60 and the rear cover section 70 are connected together by the insert molding. By configuring the front cover section 60 and the rear cover section 70 respectively using different-colored resins, therefore, a plurality of colors can be easily imparted to the shroud 37, whereby the degree of freedom in setting the external appearance can be enhanced. Here, the front cover section 60 may be made of a red resin, while the rear cover section 70 may be made of a white resin.

As discussed above, according to the embodiment of the present invention, the shroud 37 is insert molded to have the overlapping part 83 where the front cover section 60 and the rear cover section 70 as the two resin members overlap with each other. The shroud 37 has the front cover section 60 constituting the external-appearance-surface side at the overlapping part 83, and the rear cover section 70 constituting the non-external-appearance-surface side while overlapping with the front cover section 60 at the overlapping part 83. The rear cover section 70 is provided with the rib 82 extending on the non-external-appearance-surface side. The sink mark generation part 82A of the rib 82 of the rear cover section 70 constituting the non-external-appearance-surface side overlaps with and is concealed by the front cover section 60 constituting the external-appearance-surface side. This makes it possible to prevent a sink mark from being generated in the external appearance surface, and to improve the external appearance. In addition, since the sink mark in the rib 82 is hidden, it is possible to enlarge the rib 82 and thereby to enhance the rigidity of the shroud 37, so that the shroud 37 can be generally reduced in plate thickness. Accordingly, a reduction in weight is achieved.

Besides, the front cover section 60 is provided at the overlapping part 83 with the projections 88 projecting toward the non-external-appearance-surface side. The projections 88 are embedded into the rear cover section 70 by insert molding, whereby the area of contact between the front cover section 60 and the rear cover section 70 at the overlapping part 83 is increased, so that the front cover section 60 and the rear cover section 70 can be firmly coupled to each other.

In addition, since the sink mark generation part 82A of the rib 82 is hidden by overlapping with the front cover section 60, the rib 82 can be enlarged to a size such as to be usable as a contact part for the radiator 5. Therefore, the shroud 37 can be locked by putting a rib of the shroud 37 in contact with the rib 82.

Furthermore, since the overlapping part 83 is set overlapping with the side plate portion 5C of the radiator 5 in side view, the shroud 37 can be locked by putting the rib 82 in contact with the radiator 5.

In addition, since the front cover section 60 and the rear cover section 70 are formed in different colors by insert molding, the degree of freedom in setting the external appearance can be enhanced.

Incidentally, the illustrative embodiment, as discussed above, shows a mode of application of the present invention. However, the present invention is not restricted to the embodiment.

While the shroud 37 covering the radiator 5 has been described as the exterior cover in the above embodiment, this is not restrictive of the present invention, and the exterior cover may be a cover which covers other portion of the saddle-type vehicle. For instance, the exterior cover may be a cover which covers from a lateral side(s) a main frame(s) and a down frame in a saddle-type vehicle not provided with a radiator 5 and which is mounted to a fuel tank. In this case, the cover may be formed with a rib at an external appearance surface of an overlapping part thereof, and the rib may be put in contact with a side surface of the fuel tank.

Besides, while the shroud 37 has been described as having the overlapping part 83 where the front cover section 60 and the rear cover section 70 as the two resin members overlap with each other in the above embodiment, this is not restrictive of the present invention. It suffices for the overlapping part to be a part where at least two resin members overlap with each other.

For example, in the case where the shroud is formed by integrally uniting three resin members, the overlapping part may have a configuration wherein the three resin members overlap with one another. In this case, it suffices that the resin member constituting the non-external-appearance surface at the overlapping part, among the three resin members, is provided with the rib.

In addition, while the shroud 37 has been described as being produced by insert molding in the above embodiment, this is not restrictive of the present invention.

The shroud 37 may be produced by multi-color molding in which a mold is used. In the case where multi-color molding is applied to the shroud 37 in the above embodiment, the shroud 37 is produced by two-color molding, since the shroud 37 is split into two parts. In this case, first, using a mold for two-color molding, the front cover section 60 is molded as a primary molded product. Next, without demolding the front cover section 60, the mold at only the part corresponding to the rear cover section 70 is changed. Thereafter, a resin is poured into the mold, whereby the shroud 37 having the front cover section 60 and the rear cover section 70 integrally united together is produced. In the two-color molding, also, different-colored resins are used respectively for the front cover section 60 and the rear cover section 70, whereby a plurality of colors can be imparted to the shroud 37.

Furthermore, while a configuration in which most of the rib 82 exclusive of an upper end portion thereof is formed at the overlapping part 83 has been described in the above embodiment, this configuration is not restrictive. The overlapping part 83 may be extended to the upper end portion of the rib 82, and the portion ranging over the whole length of the rib 82 may be provided at the overlapping part 83.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:
1. An exterior cover for a saddle-type vehicle,
said exterior cover comprising a plurality of resin members,
wherein said exterior cover is formed by integrally uniting the plurality of resin members by one of an insert molding and a multi-color molding defining an overlapping part where at least two resin members of the plurality of resin members overlap with each other;

said plurality of resin members comprising
  a first resin member having an external-appearance-surface side at the overlapping part, and
  a second resin member having a non-external-appearance-surface side overlapping with the first resin member at the overlapping part, said second resin member having a rib formed thereon; said the rib extending on the non-external-appearance-surface side of the second resin member;
  wherein a rear part of the first resin member and a front part of the second resin member overlap with each other at the overlapping part; and
  wherein the first resin member extends vertically and the second resin member extends rearwardly from a lower portion of the first resin member.

2. The exterior cover for a saddle-type vehicle according to claim 1, wherein the first resin member comprises a projection provided at the overlapping part; and wherein said projection projects toward the non-external-appearance-surface side of the second resin member.

3. The exterior cover for a saddle-type vehicle according to claim 2, wherein the exterior cover is a radiator shroud which covers a radiator, and the rib is a contact part which makes contact with the radiator.

4. The exterior cover for a saddle-type vehicle according to claim 2, wherein the plurality of resin members are formed in different colors by one of the insert molding and the multi-color molding.

5. The exterior cover for a saddle-type vehicle according to claim 1, wherein the exterior cover is a radiator shroud which covers a radiator, and the rib is a contact part which makes contact with the radiator.

6. The exterior cover for a saddle-type vehicle according to claim 5, wherein the overlapping part is arranged in an overlapping manner with an outer surface of the radiator, when viewed in a side view.

7. The exterior cover for a saddle-type vehicle according to claim 6, wherein the plurality of resin members are formed in different colors by one of the insert molding and the multi-color molding.

8. The exterior cover for a saddle-type vehicle according to claim 5, wherein the plurality of resin members are formed in different colors by one of the insert molding and the multi-color molding.

9. The exterior cover for a saddle-type vehicle according to claim 1, wherein the plurality of resin members are formed in different colors by one of the insert molding and the multi-color molding.

10. An exterior cover for a saddle-type vehicle comprising a radiator, said exterior cover comprising
  a front cover section extending vertically and covering a lateral side of the radiator;
  a rear cover section extending rearwardly from a lower portion of said front cover section;
  a plurality of projections formed on the front cover section, said projections extending towards and embedded in said rear cover section; and
  a rib formed on the rear cover section, said rib being configured to engage with said radiator;
  wherein in an assembled state, a rear part of the front cover section and a front part of the rear cover section overlap with each other.

11. An exterior cover for a saddle-type vehicle according to claim 10, wherein said front cover section and the rear cover section overlap each other defining an overlapping part; wherein said front cover section has an external-appearance-surface side at the overlapping part, and the rear cover section has a non-external-appearance-surface side overlapping with the front cover section at the overlapping part.

12. An exterior cover for a saddle-type vehicle according to claim 11, wherein the overlapping part is arranged in an overlapping manner with an outer surface of the radiator, when viewed in a side view.

13. An external cover member for a saddle-type vehicle according to claim 10, wherein said front cover section and the rear cover section are overlapped with each other by one of insert molding and multi-color molding.

14. An exterior cover for a saddle-type vehicle according to claim 10, wherein said rib has a sink mark generation part concealed by said front cover section.

15. An exterior cover for a saddle-type vehicle according to claim 10, wherein said front cover section has a demarcation rib formed thereon; and wherein said rib formed on the rear cover section includes a front wall portion extending along the demarcation rib of the front cover section.

16. A saddle-type vehicle comprising
  a frame;
  a radiator supported by said frame;
  a shroud comprising a plurality of cover sections, wherein said plurality of cover sections comprise a front cover section extending vertically and covering a lateral side of the radiator, and a rear cover section extending from said front cover section; and
  a rib formed on one of said cover sections of the shroud;
  wherein said rib is engaged with said radiator.

17. A saddle-type vehicle according to claim 16, and wherein said rib is formed on the rear cover section.

18. A saddle-type vehicle according to claim 16, wherein said plurality of cover section are overlapped with each other by one of insert molding and multi-color molding.

19. A saddle-type vehicle according to claim 16, wherein:
  the rear cover section extends rearwardly from a lower portion of the front cover section;
  said rib is formed on the rear cover section; and
  said rib has a sink mark generation part concealed by said front cover section.

20. A saddle-type vehicle according to claim 19, wherein:
  said front cover section has a demarcation rib formed thereon; and
  said rib formed on the rear cover section includes a front wall portion extending along the demarcation rib of the front cover section.

* * * * *